United States Patent
Tafas et al.

(10) Patent No.: US 10,891,128 B1
(45) Date of Patent: Jan. 12, 2021

(54) SOFTWARE REGRESSION DETECTION IN COMPUTING SYSTEMS

(71) Applicant: Microsoft Technology Licensing, LLC, Bellevue, WA (US)

(72) Inventors: Jihad Tafas, Redmond, WA (US); Eric Kratzer, Carnation, WA (US); Sergiy Dukhopel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/534,880

(22) Filed: Aug. 7, 2019

(51) Int. Cl.
  *G06F 8/71* (2018.01)
  *G06F 11/36* (2006.01)

(52) U.S. Cl.
  CPC ............ *G06F 8/71* (2013.01); *G06F 11/3604* (2013.01); *G06F 11/368* (2013.01); *G06F 11/3688* (2013.01)

(58) Field of Classification Search
  None
  See application file for complete search history.

(56) References Cited

U.S. PATENT DOCUMENTS

| | | | |
|---|---|---|---|
| 7,783,075 B2 | 8/2010 | Zhang et al. | |
| 8,276,126 B2 * | 9/2012 | Farnham | G06F 8/71 717/131 |
| 8,363,085 B2 | 1/2013 | Michrowski et al. | |
| 8,972,940 B2 * | 3/2015 | Kannan | G06F 8/71 717/124 |
| 9,626,277 B2 * | 4/2017 | Thangamani | G06F 11/34 |
| 9,729,824 B2 | 8/2017 | Cutler et al. | |
| 9,762,855 B2 | 9/2017 | Browne et al. | |
| 10,169,850 B1 | 1/2019 | Carey et al. | |
| 10,204,319 B2 | 2/2019 | Mondal | |
| 2010/0005341 A1 | 1/2010 | Agarwal et al. | |

(Continued)

OTHER PUBLICATIONS

Purdue, "Statistics 512: Applied Linear Models", 2018 University of Purdue at https://www.stat.purdue.edu/~boli/stat512/lectures/topic3.pdf (Year: 2018).*

(Continued)

*Primary Examiner* — Hossain M Morshed
(74) *Attorney, Agent, or Firm* — Liang IP, PLLC (57) ABSTRACT

Techniques for detecting software regression in computing systems are disclosed. One example technique includes fitting data in a dataset into a multiple variable model to obtain a set of estimated coefficients. The dataset having data representing multiple entries each containing an identification of a combination of multiple payloads included in a build of a software product and a corresponding value of a performance metric of executing the build at a computing device. The payloads individually represent a source code change, a feature enablement, or a configuration modification of the software product. The estimated coefficients individually correspond to one of the payloads. The method further includes in response to determining that a corresponding estimated coefficient of one of the payloads has an absolute value that is greater than a preset threshold, indicating that a software defect is likely present in the corresponding payload.

20 Claims, 6 Drawing Sheets

(56) References Cited

U.S. PATENT DOCUMENTS

| | | | |
|---|---|---|---|
| 2013/0103826 A1* | 4/2013 | Cremonesi | G06N 5/047 709/224 |
| 2014/0362163 A1 | 12/2014 | Winterstein et al. | |
| 2015/0254165 A1 | 9/2015 | Baril et al. | |
| 2015/0339207 A1 | 11/2015 | Hod | |
| 2016/0306735 A1* | 10/2016 | Adderly | G06F 8/65 |
| 2016/0314056 A1 | 10/2016 | Greene et al. | |
| 2017/0148487 A1 | 5/2017 | Krishnakumar et al. | |
| 2017/0316123 A1* | 11/2017 | Xu | G06Q 10/0639 |
| 2018/0218163 A1 | 8/2018 | Ananthapur bache et al. | |
| 2019/0155719 A1 | 5/2019 | Padilla-ruberte | |
| 2020/0004523 A1* | 1/2020 | Eroshkina | H04L 12/66 |
| 2020/0089485 A1* | 3/2020 | Sobran | G06F 8/65 |

OTHER PUBLICATIONS

"PerfectCam", Retrieved From: https://www.cyberlink.com/products/perfectcam/features_en_US.html?r=1, Retrieved Date: May 24, 2019, 3 Pages.

"VisioBlur", Retrieved From: https://web.archive.org/web/20180823093535/https:/visioblur.io/, Aug. 23, 2018, 7 Pages.

Aggarwal, et al., "GreenAdvisor: A Tool for Analyzing the Impact of Software Evolution on Energy Consumption", In Proceedings of IEEE International Conference on Software Maintenance and Evolution, Sep. 29, 2015, 11 Pages.

Aggarwal, et al., "The Power of System Call Traces: Predicting the Software Energy Consumption Impact of Changes", In Proceedings of 24th Annual International Conference on Computer Science and Software Engineering, Nov. 3, 2014, 15 Pages.

Bangash, et al., "A Methodology for Relating Software Structure with Energy Consumption", In Proceedings of 17th IEEE International Working Conference on Source Code Analysis and Manipulation, Sep. 17, 2017, pp. 111-120.

Bendik, et al., "Finding Regressions in Projects under Version Control Systems", In Proceedings of the 13th International Conference on Software Technologies, Jul. 26, 2018, pp. 152-163.

Bezemer, et al., "Detecting and Analyzing I/O Performance Regressions", In Journal of Software: Evolution and Process, vol. 26, Issue 12, Dec. 2014, 2 Pages.

Bockelman, et al., "Smart Versioning for Files", Filed Date: May 14, 2018, 57 Pages.

Hay, Will Jr., "The Architecture and History of Git: A Distributed Version Control System", Retrieved From: https://medium.com/@willhayjr/the-architecture-and-history-of-git-a-distributed-version-control-system-62b17dd37742, Dec. 7, 2018, 11 Pages.

Hindle, Abram, "Green Mining: A Methodology of Relating Software Change to Power Consumption", In Proceedings of 9th IEEE Working Conference of Mining Software Repositories, Jun. 2, 2012, 10 Pages.

Muslu, et al., "Transition from Centralized to Decentralized Version Control Systems: A Case Study on Reasons, Barriers, and Outcomes", In Proceedings of 36th International Conference on Software Engineering, May 31, 2014, pp. 334-344.

Ramadani, "Which Change Sets in Git Repositories Are Related?", In Proceedings of IEEE International Conference on Software Quality, Privileged and Confidential 10 AM/SS/PS1 Reliability and Security, Aug. 1, 2016, 8 Pages.

Zhang, "Light Weight Background Blurring for Video Conferencing Applications", In Proceedings of International Conference on Image Processing, Oct. 8, 2006, 4 Pages.

Danilov, et al., "Using Neural Network Models in the Quality Management System for the Software Defect Prediction", In IOP Conference Series: Materials Science and Engineering, vol. 537, Issue 4, May 1, 2019, 7 Pages.

Nguyen, et al., "Automated Detection of Performance Regressions Using Statistical Process Control Techniques", In Proceedings of the 3rd ACM/SPEC International Conference on Performance Engineering, Jan. 1, 2016, 12 Pages.

"International Search Report & Written Opinion Issued in PCT Application No. PCT/US20/037119", dated Oct. 12, 2020, 15 Pages.

\* cited by examiner

SOFTWARE REGRESSION DETECTION IN COMPUTING SYSTEMS

BACKGROUND

Software regression or software performance regression generally refers to certain negative effects in performance related to one or more features of a software product after applying software updates, patches, or other types of changes to the software product. For example, a software product running on a smartphone can receive an update from version 1.1 to version 1.2. However, after installing version 1.2, the smartphone executing the software product can experience a significantly increase in power consumption under similar conditions as prior to applying the update. In other examples, the applied update may render certain features of the software product to malfunction, may render the smartphone to consume more memory, or even crash the smartphone. Such software regression can thus negatively impact user experience of the software product.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Symptoms of software regression may be apparent to users and software developers. However, determining what causes of software regression may be difficult. Operating systems, complex software applications, and other types of software products are typically developed by a large number of development teams organized into a hierarchy. Each team may submit or "check in" one or more changes and/or configuration modifications (collectively referred to herein as "payloads") to source code of a software application at a corresponding level in the hierarchy daily, weekly, bi-weekly, monthly, or in other time intervals. Subsequently, the payloads checked in can be propagated to higher levels in the hierarchy which may also include payloads from other development teams. Periodically, a version of the source code of the software product with various payloads can be compiled into executable instructions as a distinct "build" of the software product. One or more computing devices (e.g., servers in a testing lab or client devices of users signed up for testing) can then execute the build of the software product and collect various performance metrics for analysis. Examples of performance metrics can include power consumption, processor load, memory consumption, execution latency, and/or other suitable types of metrics. The collected metrics can be transmitted to a regression detector, for instance, hosted on a server for regression analysis.

Ideally, if each build only includes one change to the source code, then an impact of the payload to the performance of the software product can be easily detected. However, compiling source code with only one payload is neither efficient nor feasible due to complexity of today's software products. In practice, each build of a software product typically includes a large number of payloads. For instance, individual builds of an operating system (e.g., iOS® provide by Apple, Inc. of Mountain View, Calif.) can include hundreds or even thousands of payloads. As such, determining impact of one of these payloads to the measured performance metrics of the software product can be rather difficult. In addition, as time goes on, payloads from lower levels can be propagated into higher levels of the hierarchy with additional payloads from other development teams. Thus, the additional payloads can mask impact of the payloads from the lower levels and render software regression detection difficult.

Several embodiments of the disclosed technology are directed to techniques for detecting software regression by analyzing performance metrics of various builds of a software product denominated by various payloads included in each build. In certain embodiments, a regression detector can be configured to receive data representing measured performance metrics of multiple builds of a software product and a list of payloads included in each of the builds. In certain implementations, each payload can be assigned a unique identification number or other suitable forms of identification and tracked for the multiple builds of the software product. For example, the regression detector can be configured to receive the following partial example dataset listed in the table below:

| Build No. | Payload A | Payload B | Payload C | Metric |
|---|---|---|---|---|
| 1 | 0 | 1 | 1 | 120 |
| 2 | 1 | 1 | 0 | 108 |
| 3 | 1 | 1 | 1 | 100 |
| 4 | 1 | 0 | 1 | 116 |

In the table above, four builds (i.e., Build No. 1-4) have been compiled and executed to collect corresponding metric values (i.e., "120," "108," "100," and "116"). Each of the four builds can include a combination of various payloads with a corresponding identifier (i.e., "Payload A," "Payload B," and "Payload C"). Presence of a payload in a build is indicated with "1" while absence of a payload in a build is indicated with "0." In other examples, the identification and/or the presence/absence of the payloads can be represented with other values or in other suitable manners.

The regression detector can be configured to perform statistical analysis of the received dataset using the identification and presence/absence of each of the payloads as a denominator. For instance, the regression detector can be configured to apply multiple linear regression to the received dataset to generate a set of regression coefficients for the respective payloads. In a dataset with one dependent variable $Y_i$ (e.g., the "Metric") and multiple independent variables $X_{ip}$ where p corresponds to, e.g., different payloads (e.g., "Payload A," "Payload B," and "Payload C"), a linear relationship between the dependent variable and the independent variables can be modeled using a disturbance term or error variable ε, as follows:

$$Y_i = \beta_0 + \beta_1 X_{i1} + \ldots + \beta_p X_{ip} + \varepsilon_i, \text{ where } i=1,2,\ldots,n$$

The coefficients (i.e., $\beta_0, \beta_1, \ldots, \beta_p$) can be estimated using various techniques, such as least squares estimation, maximum likelihood estimation, ridge regression, least absolute deviation, etc. As such, by estimating the coefficients using a suitable technique, a multiple linear model of the received dataset can be obtained.

In certain embodiments of the disclosed technology, using the obtained multiple linear model, the regression detector can be configured to determine which one or more of the payloads have statistically significant impact (i.e., above a noise level) to the performance metrics in the received dataset. For instance, example coefficients for the foregoing payloads may be as follows:

| Payload No. | Payload A | Payload B | Payload C |
|---|---|---|---|
| Coefficient | −0.21 | 0.25 | 10.4 |

In the above example, the estimated coefficients for Payload A and Payload B are −0.21 and 0.25, respectively. The estimated coefficient for Payload C is 10.4 while an intercept ($\beta_0$) for the model is 100.5. As such, the multiple linear model for the received dataset can be expressed as follows:

$$Y_i = 100.5 - 0.21 X_{i1} + 0.25 X_{i2} + 10.4 X_{i3} + \varepsilon_i,$$
where $i = 1, 2, \ldots, n$ In certain embodiments, the regression detector can be configured to detect, identify, or select one or more payloads as impacting the performance metrics of the software product (referred to herein as a "significant payloads") from the multiple linear model based on a preset threshold. For instance, in the example above, the regression detector can be configured to select "Payload C" as a significant payload based on a threshold of ±0.5. In certain implementations, the threshold can be set corresponding to a noise level in the received dataset. In other implementations, the threshold can be set in other suitable manners with other suitable values.

In further embodiments, the regression detector can be configured to force one or more of the estimated coefficients (i.e., $\beta_1, \ldots, \beta_p$) corresponding to the payloads to be zero. As such, only a subset of the payloads is included in the multiple linear model. For instance, the regression detector can be configured to apply the Least Absolute Shrinkage and Selection Operator ("LASSO") when estimating the coefficients corresponding to the payloads in the multiple linear model. According to LASSO, a sum of absolute values of the coefficients can be forced to be less than a fixed threshold during estimation. Such limitation on the sum of the absolute values of coefficients can force certain one(s) of the coefficients to be set to zero, for instance, those corresponding to "Payload A" and "Payload B" in the above example. As such, a simpler model based on only "Payload C" can be obtained, as follows:

$$Y_i = 100.5 + 10.4 X_{i3} + \varepsilon_i, \text{ where } i = 1, 2, \ldots, n$$

In further examples, the limitation on the sum can be adjusted such that a number of the multiple payloads is less than another threshold (e.g., five, ten, fifteen, etc.).

Upon detecting one or more significant payloads, the regression detector can be configured to perform one or more remedial actions. In one example, the regression detector can be configured to generate and transmit a message to a development team associated with submitting the significant payload to indicate a presence of a bug or other types of software defect in the significant payload. In another example, the regression detector can also be configured to supply a build of the software product that does not include the significant payload for deployment in a computing system. In yet another example, the regression detector can be configured to automatically cause the significant payload to be reversed in source code of the software product, by, for instance, compiling another build without the significant payload. In further examples, the regression detector can be configured to notify users having builds that include the significant payload, create a patch for reversing the significant payload, and/or perform other suitable remedial actions.

Several embodiments of the disclosed technology can thus "unscramble" contributions of various payloads in multiple builds to performance metrics of the software product. Without being bound by theory, it is believed that a significant payload can propagate from lower levels in the hierarchy to higher levels. As the significant payload propagates, a corresponding contribution to the performance metrics is detected and represented by the measured performance metrics. As such, by using each payload as a denominator, analysis of the performance metrics can reveal a coefficient of the payload to the measured performance metrics in various builds. Based on such a coefficient, the regression detector can thus detect which one or more of the payloads have statistically significant impact on the measured performance metrics.

DETAILED DESCRIPTION

Certain embodiments of systems, devices, components, modules, routines, data structures, and processes for detecting software regression in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-6.

As used herein, the term "software regression" or "software performance regression" generally refers to certain negative effects in performance related to one or more features of a software product after applying software updates, patches, or other types of changes to the software product. For example, a software product executing on a computing device can receive an update from version 1.1 to version 1.2. However, after installing version 1.2, the computing device can experience a significantly increase in power consumption under similar conditions as prior to applying the update. In other examples, the applied update may render certain features of the software product to malfunction, may render the computing device to consume more memory or other types of computing resources, or even crash the computing device. Also used herein, a "software product" can refer to a standalone software application (e.g., a word processor, a spreadsheet application, a web browser, etc.), an operating system (e.g., iOS provided by Apple, Inc. of Mountainview Calif.), a component of a standalone application or operating system (e.g., a device driver, an add-in module to a web browser, etc.), a software platform (e.g., Amazon Web Services® provided by Amazon, Inc. of Seattle, Wash.), or other suitable types of software programs.

Also used herein a "payload" generally refers to any one or more of a change to source code of a software application, an enablement of a feature of the software application, or a configuration change to execution of the software product. Operating systems and other complex software products are typically developed by a large number of developers organized into development teams in a hierarchy. Each development team may submit or "check in" one or more payloads to a software product. The checked in payloads can then be propagated to higher levels in the hierarchy in the development cycle. In accordance with embodiments of the disclosed technology, each checked in payload can be tracked using a unique identifier, such as an alphanumerical value or other suitable identifications.

Periodically, a version of the source code of the software product with various payloads from one or more levels in the hierarchy can be compiled into executable instructions as a distinct "build" of the software product associated with a distinct build identifier. Due to different date/time of checking in payloads by different development teams and the propagation of the checked in payload to higher and/or lower levels of the hierarchy, different builds of the software product can each include a unique combination of payloads from the various development teams. For instance, a first build can include payloads A, B, and C; a second build can include payloads A, C, and D; and a third build can include payloads B, C, and D.

The various builds can then be tested by, for instance, being provided as a beta version of the software product to users signed up for testing. One or more computing devices (e.g., servers in a testing lab or client devices of the users) can then execute the various builds of the software product and values of various "performance metrics" can be collected for regression analysis. Examples of performance metrics can include power consumption, processor load, memory consumption, execution latency, and/or other suitable types of metrics. The collected values of the performance metrics can include or otherwise being associated with a build identifier, identifications of payloads included in a build corresponding to the build identifier, or other suitable information.

Also used herein "multiple variable model" generally refers to a mathematical model in which values of a dependent variable depend on two, three, four, or any suitable numbers of multiple dependent variables. One example multiple variable model is a "multiple linear model" in which values of a dependent variable is linearly proportional to values of multiple dependent variables as follows:

$$Y_i = \beta_0 + \beta_1 X_{i1} + \ldots + \beta_p X_{ip} + \varepsilon_i, \text{ where } i=1,2,\ldots,n$$

The coefficients (i.e., $\beta_0, \beta_1, \ldots, \beta_p$) can be estimated using various techniques, such as least squares estimation, maximum likelihood estimation, ridge regression, least absolute deviation, etc. Other examples of multiple variable model can also include parabolic, sinusoidal, or other suitable non-linear models.

Symptoms of software regression may be apparent to users and software developers but determining what causes of software regression may be difficult due to multiplicity of payloads included in each build of a software product. Ideally, if each build only includes one payload, then an impact of the payload to the performance of the software product can be easily detected. However, compiling source code with only one payload is neither efficient nor feasible due to complexity of today's software products. In practice, each build of a software product typically includes hundreds or even thousands of payloads. As such, determining impact of one of these payloads to the measured performance metrics of the software product can be rather difficult. In addition, as time goes on, payloads from lower levels can be propagated into higher levels of the hierarchy with additional payloads from other development teams. Thus, the additional payloads can mask impact of the payloads from the lower levels and render software regression detection difficult.

Several embodiments of the disclosed technology are directed to techniques for detecting software regression by analyzing performance metrics of various builds of a software product based on payloads included in the builds. In certain implementations, a dataset can be compiled to include multiple entries each containing data representing an identification of multiple payloads included in a build of a software product executed at a computing device and a corresponding value of a performance metric of executing the build at the computing device. Upon accessing the dataset, at the computing system, a set of coefficients individually corresponding to one of the multiple payloads can be estimated using a multiple variable model with the performance metric as a dependent variable and the multiple payloads as independent variables. Based on the multiple variable model, one of the multiple payloads with a corresponding estimated coefficient whose absolute value is greater than a preset threshold can be identified as impacting the performance metrics of the software product. As such, by using each payload as a denominator, analysis of the performance metrics can reveal a coefficient of the payload to the measured performance metrics in various builds, as described in more detail below with reference to FIGS. 1A-6.

Figure 1A:
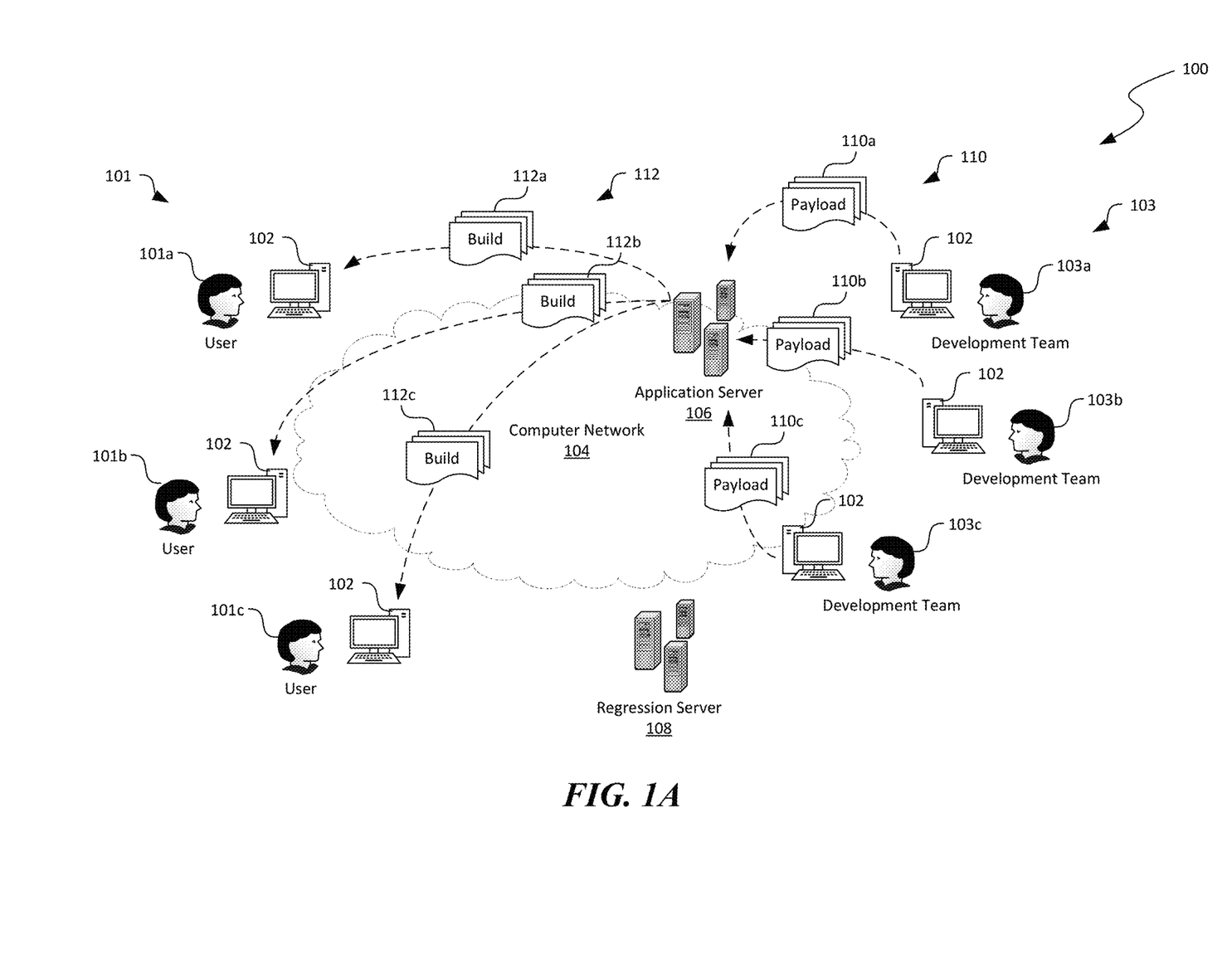
FIGS. 1A and 1B are schematic diagrams illustrating certain operational stages of detecting software regression in a computing environment in accordance with embodiments of the disclosed technology.
Figure 1B:
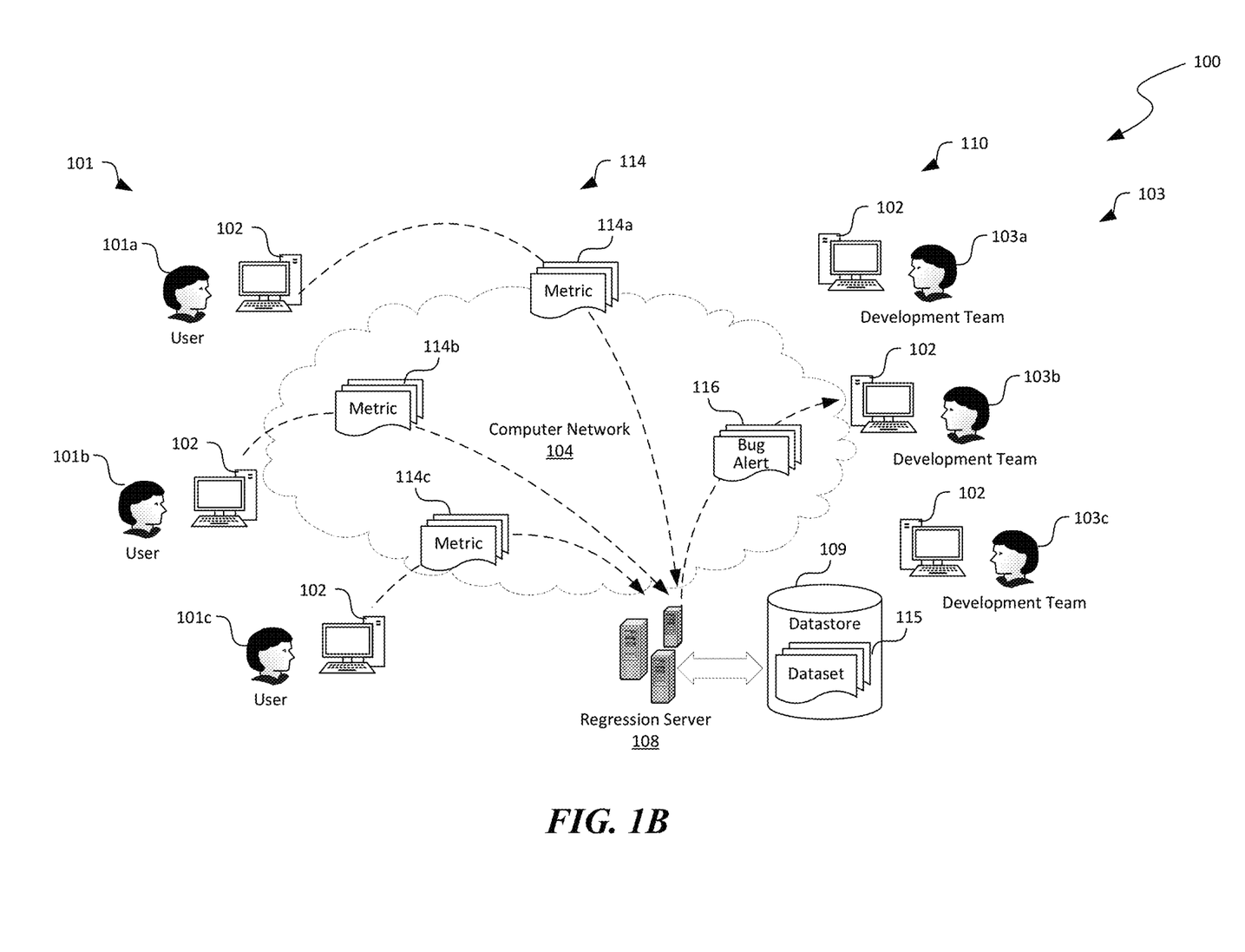

FIGS. 1A and 1B are schematic diagrams illustrating certain operational stages of detecting software regression in a computing environment 100 in accordance with embodiments of the disclosed technology. As shown in FIG. 1A, the computing environment 100 can include client devices 102 corresponding to users 101 and development teams 103, an application server 106, and a regression server 108 communicatively coupled to one another via a computer network 104. Though particular components of the computing environment 100 is shown in FIG. 1A, in other implementations, the computing environment 100 can also include web servers, database servers, and/or other suitable components in addition to or in lieu of those shown in FIG. 1A.

The client devices 102 can each include a computing device that facilitates the users 101 and the development teams 103 to communicate with the application server 106 and/or the regression server 108 via the computer network 104. In the illustrated embodiment, the client devices 102 each includes a desktop computer. In other embodiments, the client devices 102 can also include servers, laptop computers, tablet computers, smartphones, or other suitable computing devices. Though three users 101 and three development teams 103 are shown in FIG. 1A for illustration purposes, in other embodiments, the computing environment 100 can facilitate communications of other suitable numbers of users 101 and development teams 103.

The computer network 104 can include any suitable types of network. For example, in one embodiment, the computer network 104 can include an Ethernet or Fast Ethernet network having routers, switches, load balancers, firewalls, and/or other suitable network components implementing TCP/IP or other suitable types of protocol. In other embodiments, the computer network 104 can also include an InfiniBand network with corresponding network components. In further embodiments, the computer network 104 can also include a combination of the foregoing and/or other suitable types of computer networks.

The application server 106 can be configured to receive various payloads 110 (shown as first, second, and third payloads 103a-103c, respectively) to a software product submitted by the corresponding development teams 103 daily, weekly, monthly, or in other suitable time intervals. Periodically, the application server 106 can be configured to compile a current version of software product having various payloads, such as the first, second, and third payloads 103a-103c, into a distinct build 112. As such, as time goes on, the application server 106 can compile and generate various builds 112 of the software product each having different combinations of the payloads 110. Though the application server 106 is shown as a single entity in FIG. 1A, in other implementations, the application server 106 can include multiple servers individually configured for perform one or more of receiving the payloads 110, compile the builds 112, providing the builds 112 to the users 101, or other suitable functions.

Upon generating the builds 112 of the software product, the application server 106 can also be configured to provide the various builds 112 to the users 101 for testing, for instance, as beta versions of the software product. While executing the builds 112, the client devices 102 of the users 101 can generate and collect performance metrics 114 (FIG. 1B) from the software product and/or the client devices 102. As shown in FIG. 1B, the client devices 102 can then transmit the collected performance metrics 114 to the regression server 108 for software regression analysis.

The regression server 108 can include a regression detector 121 (shown in FIG. 2) that is configured to analyze the received data of performance metrics 114 from the client device 102 of the users 101 and identify one or more payloads 110 (FIG. 1A) from those included in the various builds 112 (FIG. 1A) that likely have caused software regression in the software product. As shown in FIG. 1B, upon receiving the performance metrics 114 from the client devices 102, the regression server 108 can be configured to assemble the received performance metrics 114 into a dataset 115 having identification of multiple payloads 110 included in a build 112 of the software product executed at the computing devices 102 and a corresponding value of a performance metric 114 of executing the build 112 at the computing devices 112. The regression server 108 can then access the assembled dataset 115 and identify the one or more payloads 110 that impact the performance metrics 114 by applying a multiple variable model to the dataset 115. Example components of the regression detector 121 are described in more detail below with reference to FIG. 2.

Upon detecting that one or more payloads 110 impact the performance metrics 114 of the software product, the regression server 108 can be configured to perform one or more remedial actions. In one example as shown in FIG. 1B, the regression server 108 can be configured to generate and transmit a message (shown as "Bug Alert 116") to a development team 103 (e.g., the second development team 103b) associated with submitting the payload 110 to indicate a likely presence or probability of a bug or other types of software defect in the payload 110. In another example, the regression server 108 can also be configured to instruct the application server 106 (FIG. 1A) to only supply builds 112 of the software product without the identified payload 110 for deployment in a computing system. In yet another example, the regression server 108 can be configured to automatically causing the identified payload 110 be reversed in source code of the software product, by, for instance, generating another build 110 by compiling the source code of the software product without the identified payload 110. In further examples, the regression detector can be configured to notify users having builds 112 that include the identified payload 103, create a patch for reversing the identified payload 103, and/or perform other suitable remedial actions.

Several embodiments of the disclosed technology can thus "unscramble" contributions of various payloads 110 in multiple builds 112 to performance metrics 114 of the software product. Without being bound by theory, it is believed that a payload 110 can propagate from lower levels in a hierarchy of development teams to higher levels. As the payload propagates, a corresponding contribution to the performance metrics 114 can be detected and represented by the measured performance metrics 114. As such, by using payloads 110 as denominators, analysis of the performance metrics 114 can reveal a coefficient of the payloads 110 to the measured performance metrics 114 in various builds 112. Based on such a coefficient, the regression server 108 can thus detect which one or more of the payloads 110 have statistically significant impact on the measured performance metrics 114. As a result, troubleshooting the software product can be more focused and efficient when compared to analyzing the performance metrics 114 as a whole.

Figure 2:
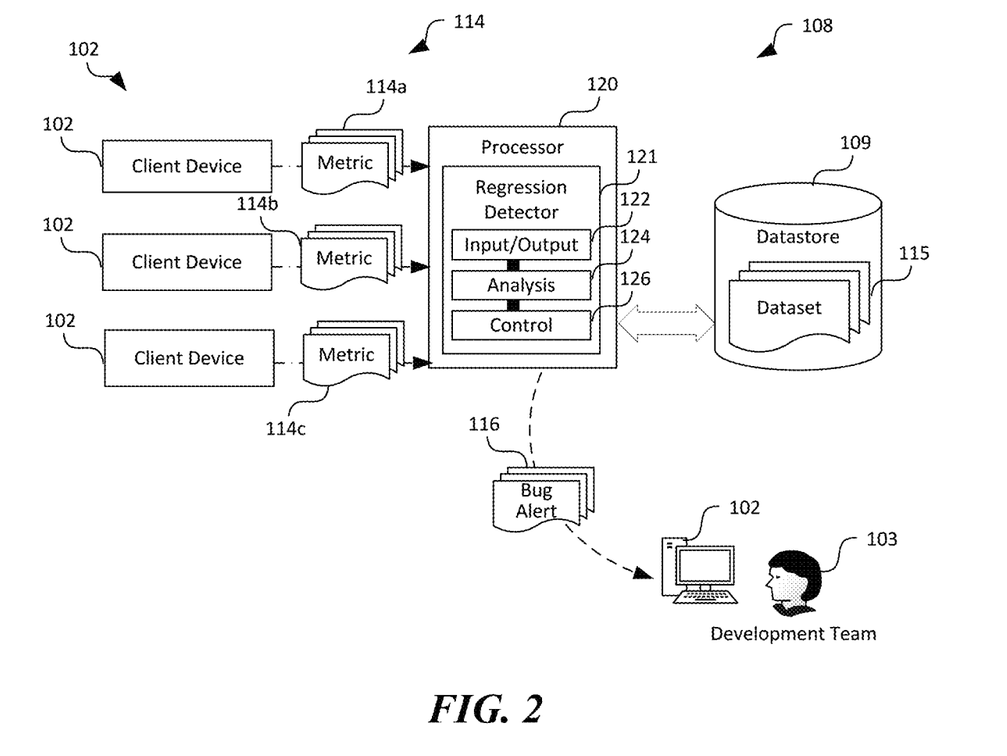
FIG. 2 is a schematic diagram illustrating example components of a regression detector in accordance with embodiments of the disclosed technology.

FIG. 2 is a schematic diagram illustrating example components of a regression detector 121 executing on a regression server 108 in accordance with embodiments of the disclosed technology. In FIG. 2 and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the regression server 108 can include a processor 120 operatively coupled to the datastore 109. The processor 120 can be configured to execute suitable instructions to provide the regression detector 121. In the illustrated embodiment, the regression detector 121 can include an input/output component 122, an analysis component 124, and a control component 126. Though particular components of the regression detector 121 are shown in FIG. 2, in other embodiments, the regression detector 121 can also include command, database, or other suitable types of components in addition to or in lieu of those shown in FIG. 2.

The input/output component 122 can be configured to receive the performance metrics 114 from the client devices 102 and assemble the received performance metrics 114 into a dataset 115. For example, a partial example dataset 115 can be as follows:

| Build No. | Payload A | Payload B | Payload C | Metric |
|---|---|---|---|---|
| 1 | 0 | 1 | 1 | 120 |
| 2 | 1 | 1 | 0 | 108 |
| 3 | 1 | 1 | 1 | 100 |
| 4 | 1 | 0 | 1 | 116 |

As shown above, four builds (i.e., Build No. 1-4) have been compiled and executed to collect corresponding metric values (i.e., "120," "108," "100," and "116"). Each of the four builds can include a combination of various payloads with a corresponding identifier (i.e., "Payload A," "Payload B," and "Payload C"). Presence of a payload in a build is indicated with "1" while absence of a payload in a build is indicated with "0." In other examples, the identification and/or the presence/absence of the payloads can be represented with other values or in other suitable manners. The input/output component 122 can also be configured to receive additional performance metrics 114 from the client devices 102 or other suitable data sources and update the dataset 115 accordingly.

The analysis component 124 can be configured to perform statistical analysis of the dataset 115 using the identification and presence/absence of each of the payloads 110 (FIG. 1A) as a denominator. In certain embodiments, the statistical analysis can include fitting data of the dataset 115 into a multiple variable model. For instance, the regression detector can be configured to apply multiple linear regression to the received dataset to generate a set of regression coefficients for the respective payloads. In a dataset 115 with one dependent variable $Y_i$ (e.g., the "Metric") and multiple independent variables $X_{ip}$ where p corresponds to, e.g., different payloads 110 (e.g., "Payload A," "Payload B," and "Payload C"), a linear relationship between the dependent variable and the independent variables can be modeled using a disturbance term or error variable ε, as follows:

$$Y_i = \beta_0 + \beta_1 X_{i1} + \ldots + \beta_p X_{ip} + \varepsilon_i, \text{ where } i=1,2,\ldots,n$$

The coefficients (i.e., $\beta_0, \beta_1, \ldots, \beta_p$) can be estimated using various techniques, such as least squares estimation, maximum likelihood estimation, ridge regression, least absolute deviation, etc. As such, by estimating the coefficients using a suitable technique, a multiple linear model of the dataset 115 can be obtained.

In certain embodiments of the disclosed technology, the analysis component can be configured to determine which one or more of the payloads 110 have statistically significant impact (i.e., above a noise level) to the performance metrics 114 in the dataset 115 using the obtained multiple linear model. For instance, example coefficients for the foregoing payloads 110 may be as follows:

| Payload No. | Payload A | Payload B | Payload C |
|---|---|---|---|
| Coefficient | −0.21 | 0.25 | 10.4 |

In the above example, the estimated coefficients for Payload A and Payload B are −0.21 and 0.25, respectively. The estimated coefficient for Payload C is 10.4 while an intercept ($\beta_0$) for the model is 100.5. As such, the multiple linear model for the received dataset can be expressed as follows:

$$Y_i = 100.5 - 0.21 X_{i1} + 0.25 X_{i2} + 10.4 X_{i3} + \varepsilon_i,$$
$$\text{where } i=1,2,\ldots,n$$

The analysis component 124 can then be configured to detect, identify, or select one or more payloads 110 as impacting the performance metrics 114 of the software product from the multiple linear model based on a preset threshold. For instance, in the example above, the analysis component 124 can be configured to select "Payload C" as a significant payload based on a threshold of ±0.5. In certain implementations, the threshold can be set corresponding to a noise level in the received dataset 115. The noise level can be calculated, for instance, by the input/output component 122 or the analysis component 124, as a standard deviation, an entropy, or other suitable indication of noise levels. In other implementations, the threshold can be set in other suitable manners with other suitable values.

In further embodiments, the analysis component 124 can be configured to force one or more of the estimated coefficients (i.e., $\beta_1, \ldots, \beta_p$) corresponding to the payloads to be zero. As such, only a subset of the payloads is included in the multiple linear model. For instance, the analysis component 124 can be configured to apply the Least Absolute Shrinkage and Selection Operator ("LASSO") when estimating the coefficients corresponding to the payloads 110 in the multiple linear model. According to LASSO, a sum of absolute values of the coefficients can be forced to be less than a fixed threshold during estimation. Such limitation on the sum of the absolute values of coefficients can force certain one(s) of the coefficients to be set to zero, for instance, those corresponding to "Payload A" and "Payload B" in the above example. As such, a simpler model based on only "Payload C" can be obtained, as follows:

$$Y_i = 100.5 + 10.4 X_{i3} + \varepsilon_i, \text{ where } i=1,2,\ldots,n$$

In further examples, the limitation on the sum can be adjusted such that a number of the multiple payloads is less than another threshold (e.g., five, ten, fifteen, etc.).

Upon detecting one or more significant payloads, the analysis component 124 can be configured to instruct the control component 126 to perform one or more remedial actions. In one example, the control component 126 can be configured to generate and transmit a message (shown as "Bug Alert 116") to a development team 103 associated with submitting the identified payload 110 to indicate a likely presence or probability of a bug or other types of software defect in the payload 110. In another example, the control component 126r can also be configured to instruct the application server 106 (FIG. 1A) to supply a build of the software product that does not include the identified payload 100 for future deployment in a computing system. In yet another example, the control component 126 can be configured to automatically causing the identified payload to be reversed in source code of the software product, by, for instance, compiling another build 112 without the identified payload 110. In further examples, the control component 126 can be configured to notify users 101 (FIG. 1A) having builds 112 that include the identified payload 110, create a patch for reversing the identified payload 110, and/or perform other suitable remedial actions.

Figure 3:
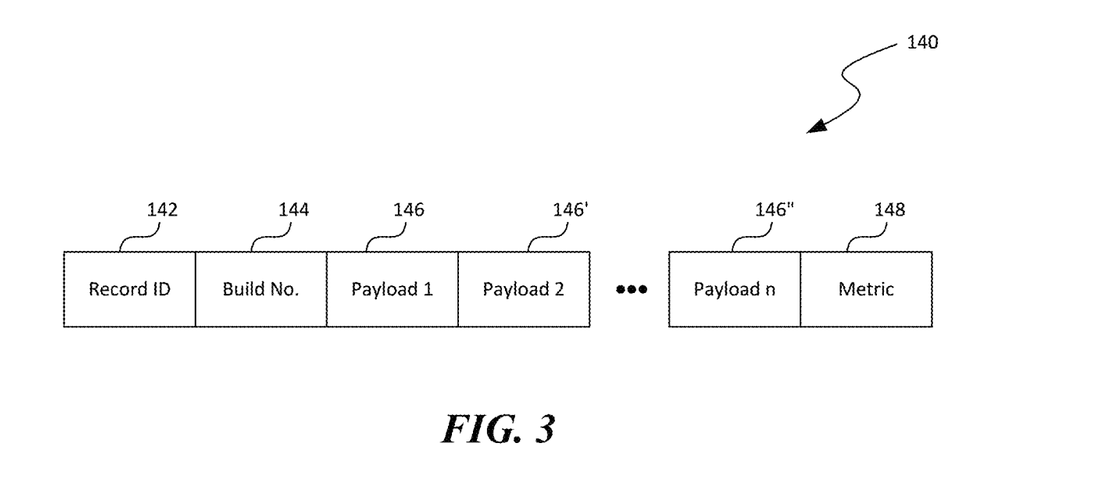
FIG. 3 is a schematic diagram illustrating an example data schema for a performance metric dataset in accordance with embodiments of the disclosed technology.

FIG. 3 is a schematic diagram illustrating an example data schema 140 for a performance metric dataset 115 in FIG. 2 in accordance with embodiments of the disclosed technology. As shown in FIG. 3, the data schema 140 can include a record ID field 142, a Build ID field 144, one or more payload fields 146 (shown as "Payload 1 146," "Payload 2 146," and "Payload n 146"), and a performance metric field 148. The record ID field 142 can be configured to contain data representing an identification (e.g., an integer, an alphanumeric string, etc.) associated with an entry in the dataset 115. The Build ID field can be configured to contain data representing a distinct identifier, such as a build number, associated with the performance metric 148. The payload fields 146 can be configured to individually contain a distinct identifier, such as an alphanumeric string, of a payload included in the build corresponding to the value in the Build ID filed. The performance metric field 148 can be configured to contain data representing a numerical value and an associated unit of measurement corresponding to a performance metric collected during execution of the build corresponding to the value in the Build ID filed.

Figure 4A:
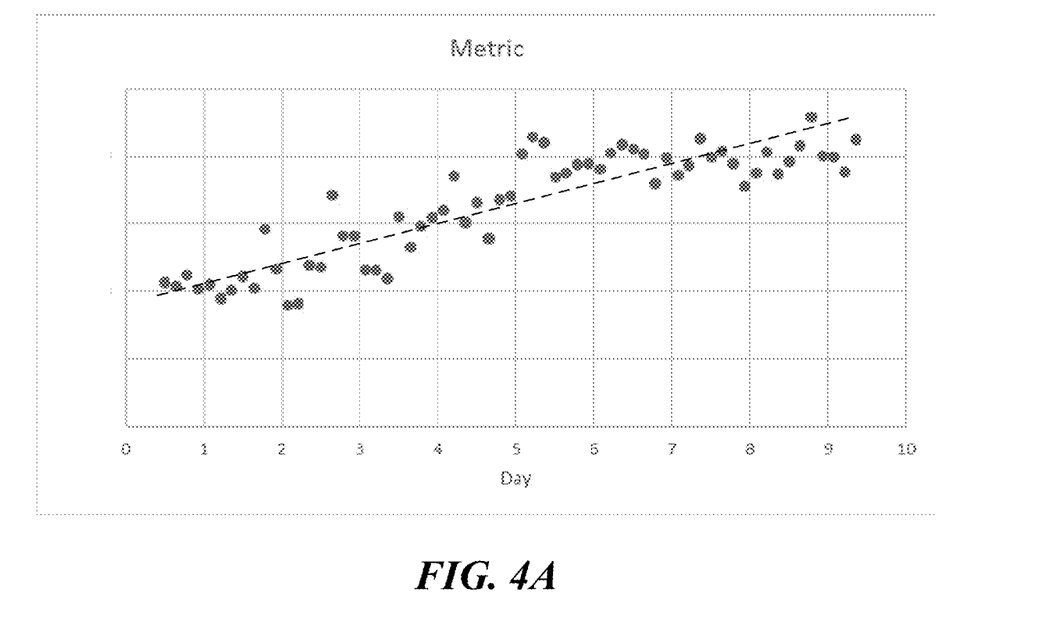
FIGS. 4A and 4B are example plots of measured performance metrics of executing various builds of a software product in accordance with embodiments of the disclosed technology.
Figure 4B:
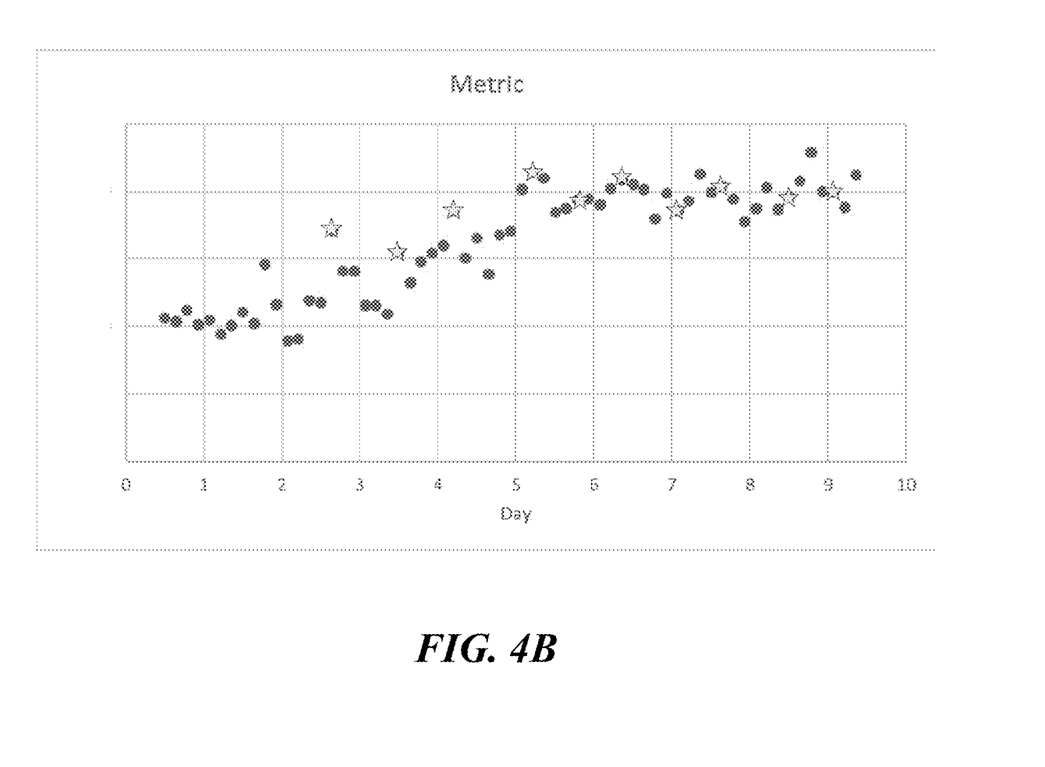

FIGS. 4A and 4B are example plots of measured performance metrics 114 of executing various builds 112 of a software product in accordance with embodiments of the disclosed technology. As discussed above with reference to FIGS. 1A-2, various builds 112 (FIG. 1A) can be executed during different days and corresponding performance metric 114 can be collected and plotted as shown in FIG. 4A. Each of the builds 112 can include multiple payloads 110, and effects of differences between a pair of consecutive builds may be within a noise level. As such, though the performance metric 114 shows a clear upward trend (represented by the dashed line) in FIG. 4A, determining which one(s) of the payload 110 that cause the upward trend on the performance metric 114 may be difficult. As shown in FIG. 4B, by applying the technique described above with reference to FIGS. 1A-2, one payload 110 (as represented by stars in FIG. 4B) can be identified as causing the upward trend in the performance metric 114. For instance, in the example shown in FIG. 4B, as the payload 110 propagates, the performance metric 114 increases accordingly. As such, the payload 110 can be a cause of deviation in the performance metric 114.

Figure 5A:
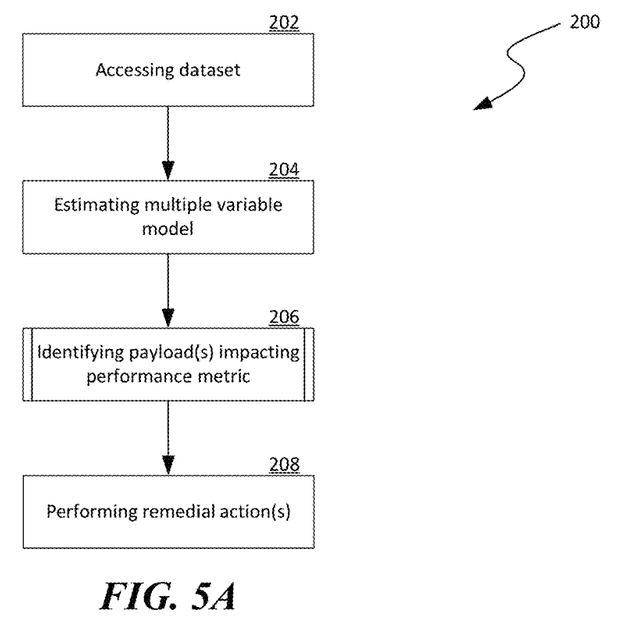
FIGS. 5A and 5B are flowcharts illustrating processes of detecting software regression in accordance with embodiments of the disclosed technology.
Figure 5B:
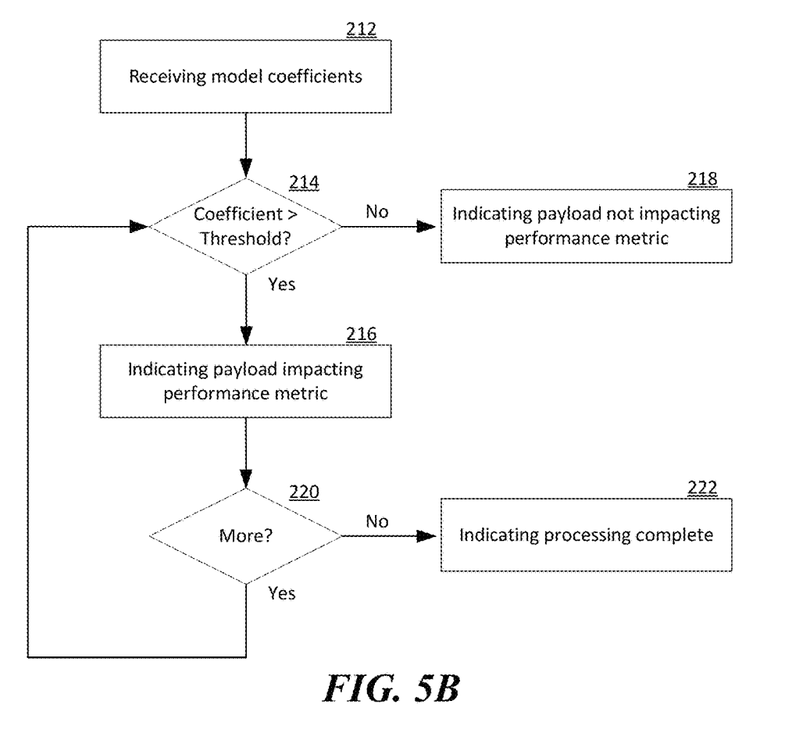

FIGS. 5A and 5B are flowcharts illustrating processes of detecting software regression in accordance with embodiments of the disclosed technology. Though embodiments of the processes are described below in the context of the computing environment 100 of FIGS. 1A and 1B, embodiments of the processes can be implemented in other computing environments with additional and/or different components.

As shown in FIG. 5A, a process 200 for detecting software regression can include accessing a dataset at stage 202. As described above with reference to FIGS. 1A-3, the dataset can include multiple entries each containing data representing an identification of multiple payloads included in a build of a software product executed at a computing device and a corresponding value of a performance metric of executing the build at the computing device. The process 200 can then include estimating a multiple variable model using the accessed dataset at stage 204. In one embodiment, estimating the multiple variable model can include fitting data in the dataset into a multiple linear model and estimate a set of linear coefficients each corresponding to one of the payloads included in the various builds. In other embodiments, estimating the multiple variable model can also include fitting the data in the dataset into other suitable types of multiple variable models. The process 200 can then include identifying one or more payloads that have statistically significant impact on the performance metric at stage 206. Example operations of identifying the one or more payloads are described below with reference to FIG. 5B. The process 200 can further include performing remedial actions based on the identified one or more payloads at stage 208. Example remedial actions are described above with reference to FIG. 1B.

As shown in FIG. 5B, the example operations for identifying one or more payloads can include receiving model coefficients individually corresponding to one of the payloads at stage 212. The operations can then include a decision stage 214 to determine whether a coefficient corresponding to a payload is above a threshold. In response to determining that the coefficient is not above the threshold, the operations include indicating that the corresponding payload does not have statistically significant impact on the performance metric at stage 218. Otherwise, the operations proceed to indicating that the corresponding payload does have statistically significant impact on the performance metric at stage 216. The operations can then include another decision stage 220 to determine whether additional coefficients are present in the received model coefficients. In response to determining that additional coefficients are present in the received model coefficients, the operations revert to determining whether an additional coefficient exceeds the threshold at stage 214. Otherwise, the operations proceed to indicating that the payload identification operation is complete at stage 222.

Figure 6:
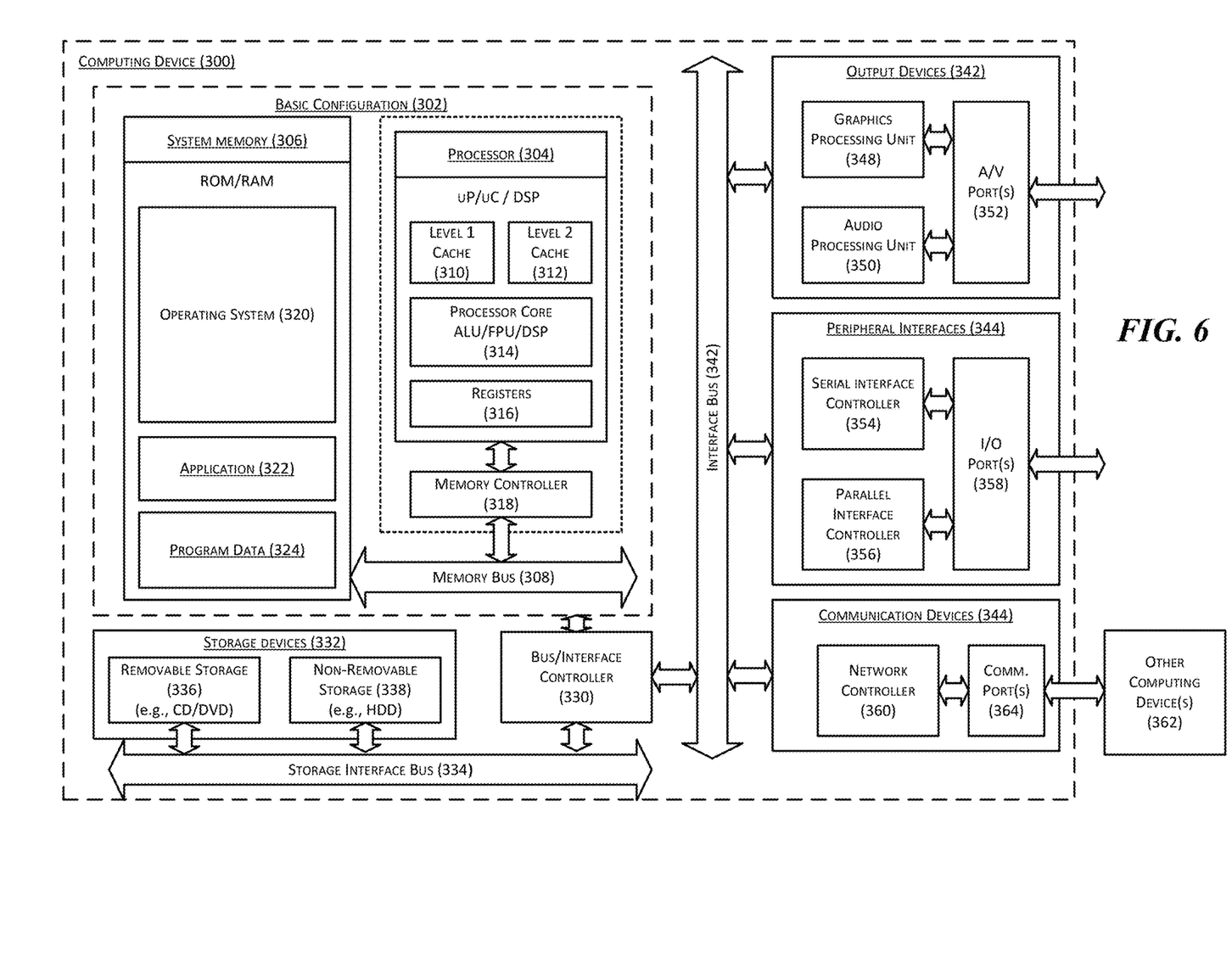
FIG. 6 is a computing device suitable for certain components of the computing system in FIGS. 1A-2.

FIG. 6 is a computing device 300 suitable for certain components of the computing system 100 in FIGS. 1A-2. For example, the computing device 300 can be suitable for the client devices 102, the application server 106, or the regression server 108 of FIGS. 1-2F. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor ($\mu P$), a microcontroller ($\mu C$), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for software regression detection in a computing system, comprising:
    accessing a dataset having multiple entries each containing data representing an identification of multiple payloads included in a build of a software product executed at a computing device and a corresponding value of a performance metric of executing the build at the computing device, the payloads individually representing a source code change, a feature enablement, or a configuration modification of the software product; and
    upon accessing the dataset, at the computing system,
        estimating a set of coefficients individually corresponding to one of the multiple payloads using a multiple variable model with the performance metric as a dependent variable and the multiple payloads as independent variables;
        identifying at least one of the multiple payloads with a corresponding estimated coefficient whose absolute value is greater than a preset threshold; and
        generating and transmitting, from the computing system, a message to a development team associated with submitting the at least one of the multiple payloads, the message indicating to the development team that a software defect that impacts the performance metric of the software product is likely present in the at least one of the payloads.

2. The method of claim 1 wherein accessing the dataset includes:
    receiving, from multiple computing devices, data representing the value of the performance metric of executing the corresponding builds of the software product; and
    compiling the received data from the multiple computing devices into the dataset having the multiple entries each containing data representing the identification of the multiple payloads included in the build of the software product executed at one of the computing devices and a corresponding value of the performance metric of executing the build.

3. The method of claim 1 wherein estimating the set of coefficients includes estimating the set of coefficients using a multiple linear model with the performance metric as a dependent variable and the multiple payloads as independent variables, thereby obtaining a set of linear coefficients individually corresponding to one of the multiple payloads.

4. The method of claim 1 wherein estimating the set of coefficients includes estimating the set of coefficients using a multiple linear model with the performance metric as a dependent variable and the multiple payloads as independent variables to obtain a set of linear coefficients individually corresponding to one of the multiple payloads, and wherein the method further includes setting one or more of the linear coefficients to zero, thereby obtaining another set of linear coefficients corresponding to a subset of the multiple payloads.

5. The method of claim 1 wherein estimating the set of coefficients includes applying Least Absolute Shrinkage and Selection Operator to estimate the set of coefficients using a multiple linear model with the performance metric as a dependent variable and the multiple payloads as independent variables, thereby forcing one or more of the coefficients corresponding to one or more of the payloads to be zero to obtain a set of linear coefficients corresponding to a subset of the multiple payloads.

6. The method of claim 1 wherein estimating the set of coefficients includes:
    estimating the set of coefficients using a multiple linear model with the performance metric as a dependent variable and the multiple payloads as independent variables; and
    wherein the method further includes:
        applying Least Absolute Shrinkage and Selection Operator during estimating the set of coefficients to force one or more of the coefficients to be zero by setting a sum of absolute values of the multiple coefficients to be less than a sum threshold; and
        adjusting the sum threshold such that the multiple linear model has a number of coefficients less than a number threshold.

7. The method of claim 1, further comprising:
    calculating, at the computing system, a noise level of the values of the performance metric in the dataset; and
    automatically setting, at the computing system, the preset threshold to be equal to or greater than the calculated noise level of the values of the performance metric in the dataset.

8. The method of claim 1, further comprising:
    re-accessing the dataset having additional entries each containing data representing an identification of multiple payloads included in a build of the software product executed at the computing device and a corresponding value of the performance metric of executing the build at the computing device; and
    upon accessing the dataset having the additional entries, at the computing system, repeating the estimating, identifying, and generating and transmitting operations based on the dataset having the additional entries.

9. The method of claim 1, further comprising:
    re-accessing the dataset having additional entries each containing data representing an identification of multiple payloads included in a build of the software product executed at the computing device and a corresponding value of the performance metric of executing the build at the computing device; and
    upon accessing the dataset having the additional entries, at the computing system, re-estimating the multiple variable model based on the accessed dataset;
    determining whether the one of the multiple payloads still has a corresponding estimated coefficient whose absolute value is greater than the preset threshold; and
    in response to determining that the one of the multiple payloads again has a corresponding estimated coefficient whose absolute value is greater than the preset threshold, indicating to the development team that a confidence level of the identified one of the multiple payloads having the software defect is high.

10. A computing device configured for software regression detection, the comprising:
    a processor; and
    a memory operatively coupled to the processor, the memory including instructions executable by the processor to cause the computing device to:
        receive a dataset having data representing multiple entries each containing an identification of multiple payloads included in a build of a software product and a corresponding value of a performance metric measured during execution of the build having the multiple payloads, the payloads individually representing a source code change, a feature enablement, or a configuration modification of the software product;
        fit the data in the received dataset into a multiple variable model with the performance metric being a dependent variable and the multiple payloads being independent variables, the fitted multiple variable model having a set of coefficients individually corresponding to one of the multiple payloads; and
        for each of the payloads,
            determine whether a corresponding one of the estimated coefficients has an absolute value that is greater than a preset threshold; and
            in response to determining that the corresponding one of the estimated coefficients has an absolute value that is greater than the preset threshold, generate and transmit, from the computing device, a message to a developer associated with submitting the corresponding one of the multiple payloads, the message indicating to the developer that a software defect that impacts the performance metric of the software product is likely present in the corresponding one of the payloads.

11. The computing device of claim 10 wherein to fit the data in the received dataset into the multiple variable model includes to estimate a set of linear coefficients individually corresponding to one of the multiple payloads.

12. The computing device of claim 10 wherein to fit the data in the received dataset into the multiple variable model includes to estimate a set of linear coefficients individually corresponding to one of the multiple payloads and set one or more of the linear coefficients to be zero, thereby obtaining a set of linear coefficients corresponding to a subset of the multiple payloads.

13. The computing device of claim 10 wherein to fit the data in the received dataset into the multiple variable model includes to:
    apply Least Absolute Shrinkage and Selection Operator to the accessed dataset to estimate a set of linear coefficients for the corresponding payloads by setting a sum of absolute values of the multiple coefficients to be less than a sum threshold; and
    adjusting the sum threshold such that an obtained set of linear coefficients corresponding to a number of the multiple payloads that is less than a number threshold.

14. The computing device of claim 10 wherein the memory includes additional instructions executable by the processor to cause the computing device to:
- calculate a noise level of the values of the performance metric in the dataset; and
- automatically set the preset threshold to be equal to or greater than the calculated noise level of the values of the performance metric in the dataset.

15. The computing device of claim 10 wherein the memory includes additional instructions executable by the processor to cause the computing device to:
- receive another dataset having entries from the dataset and additional entries each containing data representing an identification of multiple payloads included in a build of the software product executed at the computing device and a corresponding value of the performance metric of executing the build at the computing device; and
- upon receiving the dataset having the additional entries, repeat the estimating, identifying, and generating and transmitting operations based on the another dataset having the additional entries.

16. The computing device of claim 10 wherein the memory includes additional instructions executable by the processor to cause the computing device to:
- receive another dataset having entries from the dataset and additional entries each containing data representing an identification of multiple payloads included in a build of the software product executed at the computing device and a corresponding value of the performance metric of executing the build at the computing device; and
- upon receiving the dataset having the additional entries,
  - fit the another dataset into another multiple variable model;
  - determine whether the one of the multiple payloads still has a corresponding estimated coefficient whose absolute value is greater than the preset threshold; and
  - in response to determining that the one of the multiple payloads again has a corresponding estimated coefficient whose absolute value is greater than the preset threshold, indicate to the developer that a confidence level of the identified one of the multiple payloads having the software defect is high.

17. A method for software regression detection in a computing system, comprising:
- fitting data in a dataset into a multiple variable model to obtain a set of estimated coefficients, the dataset having data representing multiple entries each containing an identification of a combination of multiple payloads included in a build of a software product and a corresponding value of a performance metric of executing the build at a computing device, the payloads individually representing a source code change, a feature enablement, or a configuration modification of the software product and the estimated coefficients individually corresponding to one of the payloads; and
- for the individual payloads,
  - determining whether a corresponding one of the estimated coefficients has an absolute value that is greater than a preset threshold; and
  - in response to determining that the corresponding one of the estimated coefficients has an absolute value that is greater than the preset threshold, indicate that a software defect that impacts the performance metric of the software product is likely present in the corresponding one of the payloads and perform a remedial action in response to the indicated software defect.

18. The method of claim 17 wherein fitting the data in the dataset includes estimating a multiple linear model based on the dataset with the performance metric as a dependent variable and the multiple payloads as independent variables, thereby obtaining a set of linear coefficients individually corresponding to one of the multiple payloads.

19. The method of claim 17 wherein fitting the data in the dataset includes estimating a multiple linear model based on the dataset with the performance metric as a dependent variable and the multiple payloads as independent variables, and wherein the method further includes applying Least Absolute Shrinkage and Selection Operator during estimating the multiple linear model to force one or more of the coefficients corresponding to one or more of the payloads to be zero, thereby obtaining a set of linear coefficients corresponding to a subset of the multiple payloads.

20. The method of claim 17 wherein fitting the data in the dataset includes:
- estimating a multiple linear model based on the dataset with the performance metric as a dependent variable and the multiple payloads as independent variables; and
wherein the method further includes:
- applying Least Absolute Shrinkage and Selection Operator during estimating the multiple linear model to force one or more of the coefficients corresponding to one or more of the payloads to be zero by setting a sum of absolute values of the multiple coefficients to be less than a sum threshold; and
- adjusting the sum threshold such that an obtained set of linear coefficients corresponding to a number of the multiple payloads that is less than a number threshold.

* * * * *